(12) United States Patent
Vahidian et al.

(10) Patent No.: US 12,505,658 B2
(45) Date of Patent: Dec. 23, 2025

(54) META-PRE-TRAINING WITH AUGMENTATIONS TO GENERALIZE NEURAL NETWORK PROCESSING FOR DOMAIN ADAPTATION

(71) Applicant: QUALCOMM Incorporated, San Diego, CA (US)

(72) Inventors: Saeed Vahidian, La Jolla, CA (US); Manoj Bhat, Pittsburgh, PA (US); Debasmit Das, San Diego, CA (US); Shizhong Steve Han, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 516 days.

(21) Appl. No.: 17/939,361

(22) Filed: Sep. 7, 2022

(65) Prior Publication Data

US 2024/0078800 A1    Mar. 7, 2024

(51) Int. Cl.
*G06V 10/764* (2022.01)
*G06N 3/08* (2023.01)
(Continued)

(52) U.S. Cl.
CPC ............... *G06V 10/82* (2022.01); *G06N 3/08* (2013.01); *G06V 10/764* (2022.01); *G06V 10/774* (2022.01)

(58) Field of Classification Search
CPC .... G06V 10/82; G06V 10/764; G06V 10/774; G06N 3/08; G06N 3/09; G06N 3/0985; G06N 3/096; G01S 17/89; G01S 17/931
See application file for complete search history.

(56) References Cited

U.S. PATENT DOCUMENTS 11,681,913 B2 *  6/2023  Han .................... G06N 3/08
                                                706/20
2022/0156585 A1 *  5/2022  Leng ................ G06N 3/082

OTHER PUBLICATIONS

Puri, R., Zakhor, A., & Puri, R. (Oct. 2020). Few shot learning for point cloud data using model agnostic meta learning. In 2020 IEEE International Conference on Image Processing (ICIP) (pp. 1906-1910). IEEE. (Year: 2020).*

(Continued)

*Primary Examiner* — Gregory A Morse
*Assistant Examiner* — Renae A Bitor
(74) *Attorney, Agent, or Firm* — QUALCOMM Incorporated

(57) ABSTRACT

A method receives first and second data generated from a first and second domains including first and second set of objects, receiving first class labels for each of the first set of objects, and receiving second class labels for each of the second set of objects. The method generates a training dataset by augmenting the first data and corresponding first class labels, and locally updating neural network parameters of a model based on the training dataset. The method generates a validation dataset by augmenting the second data and corresponding second class labels, and globally updating the neural network parameters of the model based on the validation dataset. The method also generates multiple target labels for target data generated from a target domain including a third set of objects after globally updating the neural network parameters of the model based on the validation dataset.

24 Claims, 8 Drawing Sheets

(51) Int. Cl.
*G06V 10/774* (2022.01)
*G06V 10/82* (2022.01)

(56) References Cited

OTHER PUBLICATIONS

Wang, G., Luo, C., Sun, X., Xiong, Z., & Zeng, W. (2020). Tracking by instance detection: A meta-learning approach. In Proceedings of the IEEE/CVF conference on computer vision and pattern recognition (pp. 6288-6297). (Year: 2020).*

Li, Y., Ma, L., Zhong, Z., Liu, F., Chapman, M. A., Cao, D., & Li, J. (2020). Deep learning for lidar point clouds in autonomous driving: A review. IEEE Transactions on Neural Networks and Learning Systems, 32(8), 3412-3432. (Year: 2020).*

Finn C., et al., "Model-Agnostic Meta-Learning for Fast Adaptation of Deep Networks", arXiv: 1703.03400v3 [cs.LG], Jul. 18, 2017, 13 Pages.

International Search Report and Written Opinion—PCT/US2023/029781—ISA/EPO—Nov. 17, 2023.

Puri R., et al., "Few Shot Learning For Point Cloud Data Using Model Agnostic Meta Learning", 2020 IEEE International Conference on Image Processing (ICIP), Oct. 25, 2020, pp. 1906-1910.

Qi R.C., et al., "PointNet : Deep Learning on Point Sets for 3D Classification and Segmentation", arXiv: 1612.00539v1 [cs.CV], Cornell University Library, 201 Olin Library Cornell University Ithaca, NY 14853, Dec. 2, 2016, 19 Pages.

Yang J., et al., "ST3D: Self-training for Unsupervised Domain Adaptation on 3D Object Detection", arXIV:2103.05346v2 [cs.CV], Mar. 27, 2021, 18 Pages.

Wang Y., et al., "Train in Germany, Test in The USA: Making 3D Object Detectors Generalize", arXiv:2005.08139v1 [cs.CV] May 17, 2020, pp. 1-23.

Yan Y., et al., "SECOND: Sparsely Embedded Convolutional Detection", Sensors, vol. 18, Issue. 10, Published on Oct. 6, 2018, 17 Pages.

* cited by examiner

500

---
Algorithm 1: Supervised meta-learning task generation for 3D Object Detection
---
require : Source domain labeled data $S = \{P_i^s, L_i^s\}$ for some datasets e.g., Waymo, Lyft, Argoverse,...
require : $N$: class-count, $N_{MB}$: meta-batch size, $N_S$: no. of updates, $\alpha$, and $\beta$: step size hyperparameters
require : Random Object Scaling strategy, $\mathcal{ROS}$
require : $K^{(tr)}$, $K^{(val)}$ : number of samples for train and validation during meta-learning
output : The object detection model for target domain 1 Randomly initialize the source model with $\theta$ ⎯⎯ 502
2 while not done do
3     for i in $1, ..., N_{MB}$ do
4        Sample $N$ annotated 3D bounding boxes with different labels from $S$ ⎯⎯ 504
5        $\mathcal{T}_i = \{(P_1^s, L_1^s), ..., (P_N^s, L_N^s)\}$ ⎯⎯ 506
6     end
7     for each $\mathcal{T}_i$ do
8        for $j$ in $1, ..., K^{(tr)} - 1$ do
9           Generate training set $D_i^{aug,(tr)} = \mathcal{ROS}(\{(P_1^s, L_1^s), ..., (P_N^s, L_N^s)\}_j)$. ⎯⎯ 508
10        end
11        $\theta_i' = \theta$ ⎯⎯ 510
12        for $k$ in $N_S$ do
13           Evaluate $\nabla_{\theta_i'} \mathcal{L}_{\mathcal{T}_i}(f_{\theta_i'})$ ⎯⎯ 512    ⎫ 514
14           Compute adapted parameters with SGD $\theta_i' = \theta_i' - \alpha \nabla_{\theta_i'} \mathcal{L}_{\mathcal{T}_i}(f_{\theta_i'})$ using $D_i^{aug,(tr)}$ ⎭
15        end
16        for $j$ in $1, ..., K^{(val)} - 1$ do
17           Generate validation set $D_i^{aug,(val)} = \mathcal{ROS}(\{(P_1^s, L_1^s), ..., (P_N^s, L_N^s)\}_j)$ ⎯⎯ 516
18        end
19     end
20     Update $\theta = \theta - \beta \nabla_\theta \sum_{\mathcal{T}_i} \mathcal{L}_{\mathcal{T}_i}(f_{\theta_i'})$ using each $D_i^{aug,(val)}$ ⎯⎯ 518
21 end
22 return $\theta$

*FIG. 5*

META-PRE-TRAINING WITH AUGMENTATIONS TO GENERALIZE NEURAL NETWORK PROCESSING FOR DOMAIN ADAPTATION

FIELD OF THE DISCLOSURE

Aspects of the present disclosure generally relate to three-dimensional (3D) object detectors.

BACKGROUND

Artificial neural networks may comprise interconnected groups of artificial neurons (e.g., neuron models). The artificial neural network may be a computational device or be represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Three-dimensional (3D) object detection is an important task for autonomous driving. Many fields in autonomous driving such as prediction, planning, and motion control rely upon a faithful representation of the 3D space around the ego vehicle. In recent years, researchers have been leveraging high precision light detection and ranging (LiDAR) point cloud data for accurate 3D object detection. A 3D object detector generates 3D bounding boxes that localize each object in an environment. Object detection is challenging because the predictions should be highly accurate, reliable, and, importantly, be made in real time. The current state of the art in 3D object detection is based on deep learning, trained on short driving segments with labeled bounding boxes, which yields high precision.

State-of-the-art 3D object detectors have shown promising accuracy but are prone to over-fitting to a training domain, causing them to fail in novel target environments. Over-fitting may occur because other cars may be larger and fewer, the roads may be snowy, and/or buildings may look different during training and may be different from those in the test environment. As a result, bounding boxes may have different heights, widths, and lengths with different data distributions when a model is trained with different datasets. It has been shown that such differences can cause a greater than 35% drop in the accuracy of systems. Eliminating this adaptation gap is a challenge for freely self-driving vehicles. It would be desirable to generalize a neural network to adapt to different environments.

SUMMARY

In aspects of the present disclosure, a computer-implemented method includes receiving first data generated from a first domain including multiple objects and receiving first class labels for each of the objects. The method also includes receiving second data generated from a second domain including a second set of objects, and receiving second class labels for each of the second objects. The method further includes generating a training dataset by augmenting the first data and corresponding first class labels, and locally updating neural network parameters of a model based on the training dataset. The method still further includes generating a validation dataset by augmenting the second data and corresponding second class labels, and globally updating the neural network parameters of the model based on the validation dataset. The method still further includes generating multiple target labels for target data generated from a target domain including a third set of objects, the target labels generated by the model after globally updating the neural network parameters of the model based on the validation dataset.

Other aspects of the present disclosure are directed to an apparatus having a memory, and one or more processors coupled to the memory. The processor(s) is configured to receive first data generated from a first domain including a first set of objects and receive first class labels for each of the first objects. The processor(s) is also configured to receive second data generated from a second domain including a second set of objects and receive second class labels for each of the second objects. The processor(s) is further configured to generate a training dataset by augmenting the first data and corresponding first class labels, and locally updating neural network parameters of a model based on the training dataset. The processor(s) is still further configured to generate a validation dataset by augmenting the second data and corresponding second class labels and globally updating the neural network parameters of the model based on the validation dataset. The processor(s) is still further configured to generate multiple target labels for target data generated from a target domain including a third set of objects, the target labels generated by the model after globally updating the neural network parameters of the model based on the validation dataset.

In other aspects of the present disclosure, a non-transitory computer-readable medium having program code recorded thereon is disclosed. The program code is executed by a processor and includes program code to receive first data generated from a first domain including a first set of objects, and program code to receive first class labels for each of the first set of objects. The program code also includes program code to receive second data generated from a second domain including a second set of objects, and program code to receive second class labels for each of the second objects. The program code further includes program code to generate a training dataset by augmenting the first data and corresponding first class labels, and program code to locally update neural network parameters of a model based on the training dataset. The program code still further includes program code to generate a validation dataset by augmenting the second data and corresponding second class labels, and program code to globally update the neural network parameters of the model based on the validation dataset. The program code still further includes program code to generate multiple target labels for target data generated from a target domain including a third set of objects, the target labels generated by the model after globally updating the neural network parameters of the model based on the validation dataset.

Other aspects of the present disclosure are directed to an apparatus for a computer-implemented method including means for receiving first data generated from a first domain including a first set of objects and means for receiving first class labels for each of the first set of objects. The apparatus also includes means for receiving second data generated from a second domain including a second set of objects and means for receiving second class labels for each of the second set of objects. The apparatus further includes means for generating a training dataset by augmenting the first data and corresponding first class labels and means for locally updating neural network parameters of a model based on the training dataset. The apparatus still further includes means for generating a validation dataset by augmenting the second data and corresponding second class labels, and means for globally updating the neural network parameters of the model based on the validation dataset. The apparatus still further includes means for generating multiple target labels for target data generated from a target domain including a third set of objects, the target labels generated by the model after globally updating the neural network parameters of the model based on the validation dataset.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 5 illustrates pseudo code for supervised meta-learning task generation for three-dimensional (3D) object detection, in accordance with aspects of the present disclosure.

DETAILED DESCRIPTION

Figure 1:
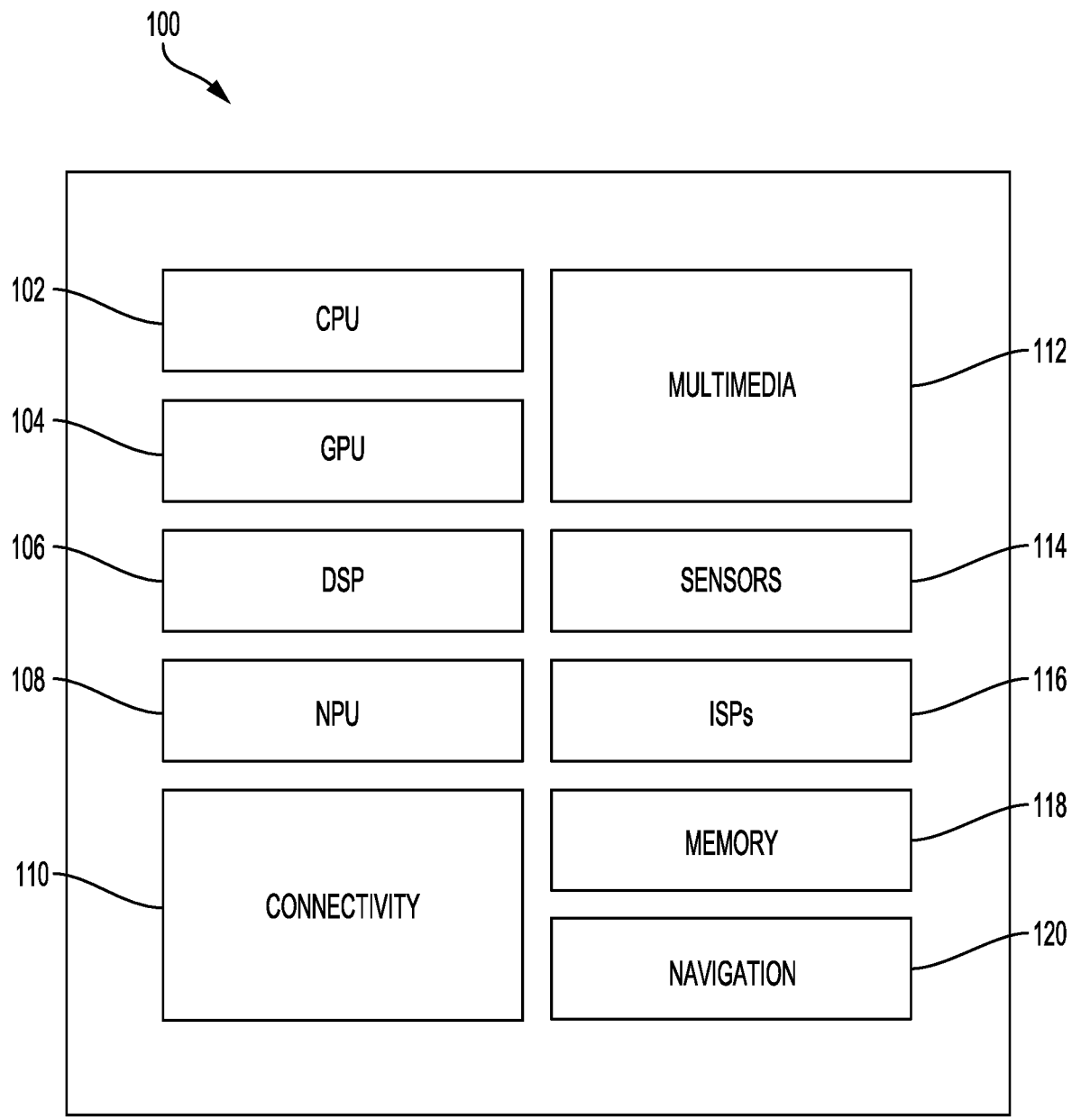
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Three-dimensional (3D) object detection is an important task for autonomous driving. Many important fields in autonomous driving such as prediction, planning, and motion control rely upon a faithful representation of the 3D space around an ego vehicle. In recent years, researchers have been leveraging high precision light detection and ranging (LiDAR) point cloud data for accurate 3D object detection. Object detection is challenging because the predictions should be highly accurate and in real time.

State-of-the-art 3D object detectors have shown promising accuracy but are prone to over-fitting to a training domain, causing them to fail in novel target environments. As a result, bounding boxes may have different heights, widths, and lengths with different data distributions when a model is trained with different datasets. Eliminating this adaptation gap is a challenge for autonomous self-driving vehicles. Aspects of the present disclosure propose a meta-learning-based approach to test generalizability of augmentations.

FIG. 1 illustrates an example implementation of a system-on-a-chip (SOC) 100, which may include a central processing unit (CPU) 102 or a multi-core CPU configured for meta-pre-training for domain adaptation. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive first data generated from a first domain including a first set of objects and receive first class labels for each of the first objects. The general-purpose processor 102 may also include code to receive second data generated from a second domain including a second set of objects and receive second class labels for each of the second objects. The general-purpose processor 102 may further include code to generate a training dataset by augmenting the first data and corresponding first class labels, and locally updating neural network parameters of a model based on the training dataset. The general-purpose processor 102 may still further include code to generate a validation dataset by augmenting the second data and corresponding second class labels and globally updating the neural network parameters of the model based on the validation dataset. The general-purpose processor 102 may still further include code to generate multiple target labels for target data generated from a target domain including a third set of objects, the target labels generated by the model after globally updating the neural network parameters of the model based on the validation dataset.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
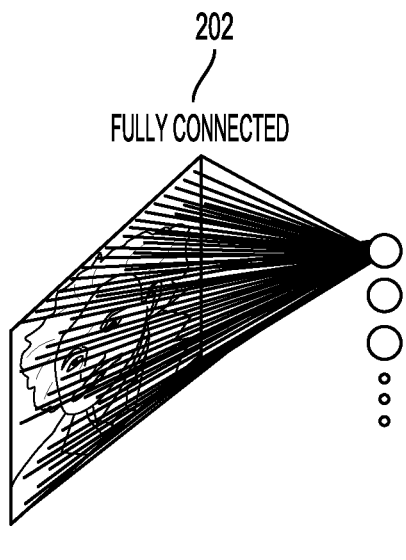
FIGS. 2A, 2B, and 2C are diagrams illustrating a neural network in accordance with aspects of the present disclosure.
Figure 2B:
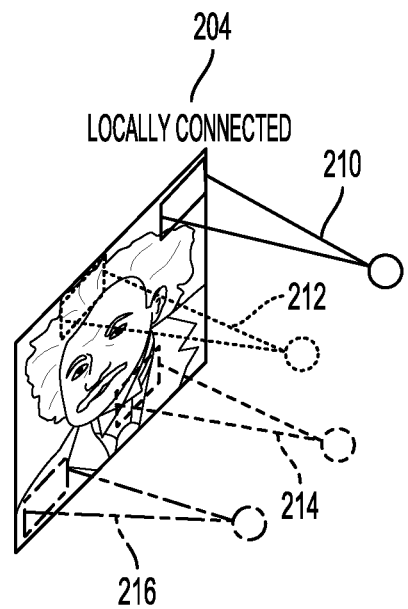

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
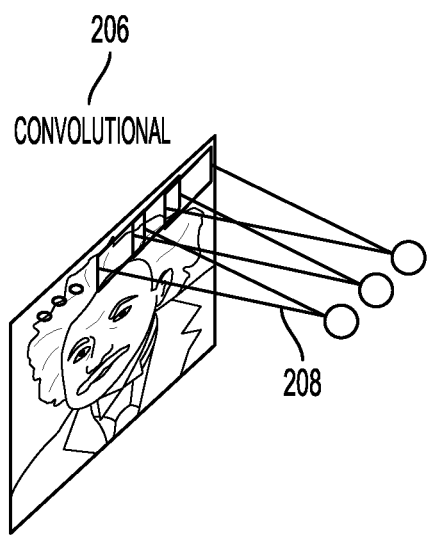

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
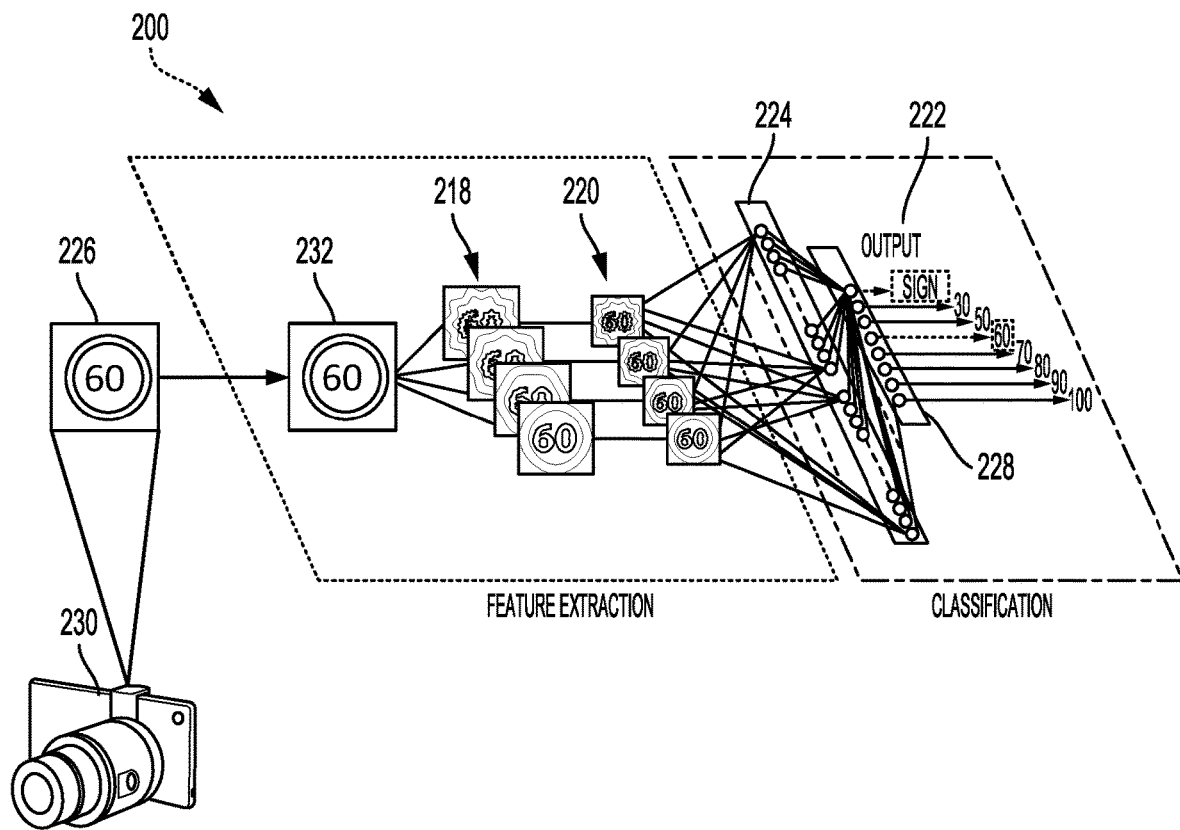
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training datasets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
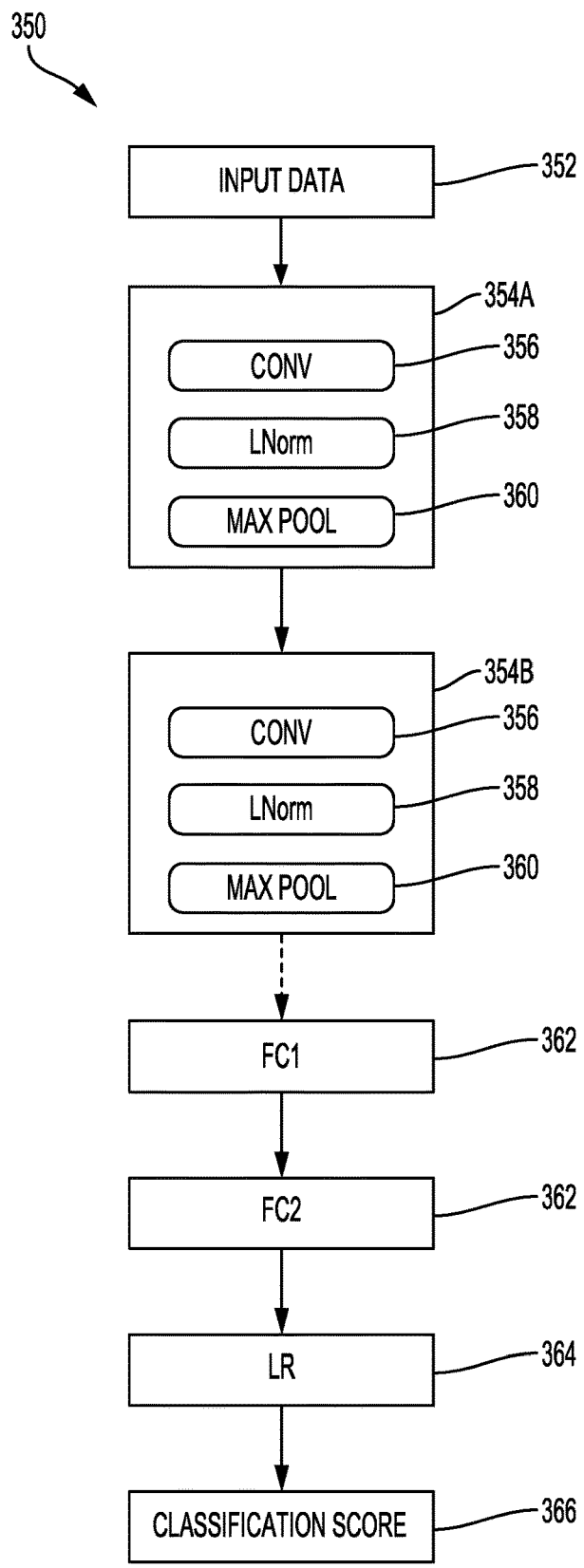
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Three-dimensional (3D) object detection includes prediction, planning, and motion control, which rely upon a faithful representation of the 3D space around the ego vehicle. In recent years, researchers have been leveraging high precision light detection and ranging (LiDAR) point cloud data for accurate 3D object detection. A 3D object detector generates 3D bounding boxes that localize each object in an environment that echoes the LiDAR light waves. The 3D bounding boxes may be cuboid bounding boxes. Object detection is challenging because the predictions should be highly accurate, reliable, and in real time.

Figure 4:
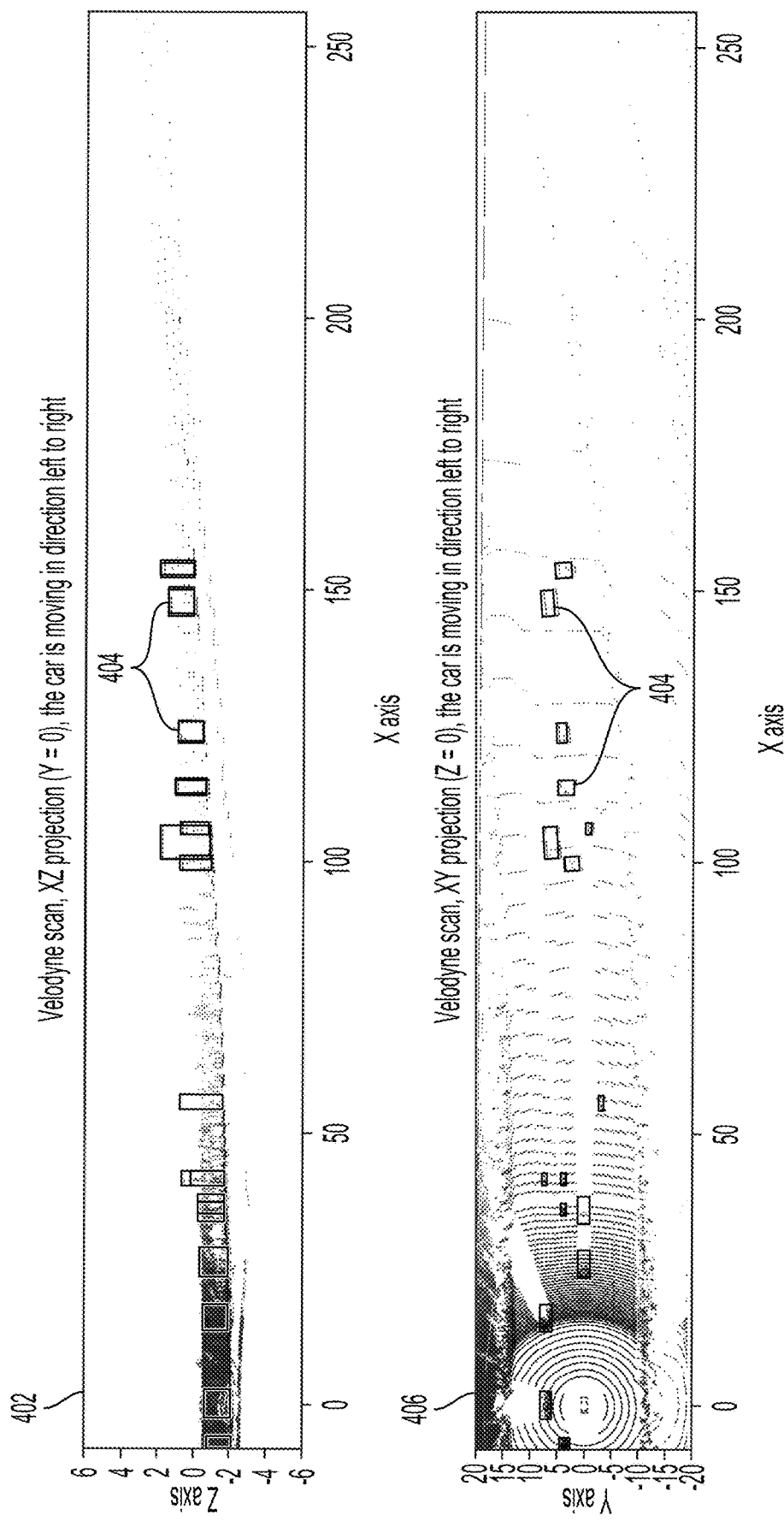
FIG. 4 illustrates exemplary representations of LIDAR point cloud data.

FIG. 4 illustrates exemplary representations of LIDAR point cloud data. In the example of FIG. 4, a side view 402 illustrates point cloud data and bounding boxes 404 generated by a 3D object detector as a vehicle is moving in a direction from left to right in an environment. Only two of the bounding boxes 404 are indicated by lead lines in the side view 402. A bird's eye view 406 also illustrates point cloud data from the same environment where the vehicle is moving from left to right. Two of the bounding boxes 404 are indicated by lead lines in the bird's eye view 406.

State-of-the-art 3D object detectors are prone to overfitting to a training domain, causing them to fail in novel target environments, resulting in bounding boxes with different heights, widths, and lengths with different data distributions when a model is trained with different datasets. It would be desirable to generalize a neural network to adapt to different environments.

Scaling-based augmentations, such as resizing the bounding boxes, have been used to pre-train robust 3D object detectors. However, generalizability during pre-training has not been evaluated. Aspects of the present disclosure propose a meta-learning-based approach to test generalizability of augmentations.

FIG. 5 illustrates pseudo code 500 for supervised meta-learning task generation for three-dimensional (3D) object detection, in accordance with aspects of the present disclosure. The pseudo code 500 illustrates one example for implementing the techniques of the present disclosure with respect to 3D object detection. The process operates with source domain labeled data S for any number of datasets. In the example of FIG. 5, the source datasets are referred to as Lyft, Waymo, and Argoverse datasets, although any labeled datasets may be used. Argoverse is a registered trademark of Argo AI, LLC of Pittsburgh, Pennsylvania, Lyft is a registered trademark of Lyft Inc. of San Francisco, California, and Waymo is a registered trademark of Waymo, LLC of Mountain View, California.

The source domain labeled data S includes input point cloud data $P_1^s$ and output labels $L_1^s$, from each dataset. The source domain labeled data S may be generated from a first domain and includes multiple objects, such as cars, trucks, cyclists, etc. A class count N corresponds to the types of objects. For example, if the first source domain labeled data S only includes a car class and a cyclist class, then N=2. The parameter $N_{MB}$ corresponds to a meta-batch size, the parameter $N_s$ corresponds to a number of updates, and the parameters $\alpha$ and $\beta$ correspond to step size hyperparameters. A random object scaling (ROS) strategy should be defined. For example, objects may be randomly scaled. An object may be 4×3×2 pixels and then scaled to 3×4×2 pixels. A number of samples for training $K^{(tr)}$ and a number of samples for validation $K^{(val)}$ may be defined for meta-learning.

Based on this information, the meta-learning task generation outputs an updated object detection model to be used for a target domain. The updated object detection model includes a final set of parameters. Referring to FIG. 5, at line 502, the pseudo code 500 randomizes an initial set of parameters θ for the object detection model. Next, at line 504, for each sample in the batch $N_{MB}$, the process samples N annotated 3D bounding boxes with each of the different labels from the source domain labeled data S. That is, bounding boxes are sampled for each object class, in this example a car and a cyclist, such that N=2. Each bounding box may have X, Y, and Z coordinates, a yaw angle, a width, a length, and a height, for example. At line 506, a task $T_i$ may be defined with samples corresponding to the input data P and output labels L for each sample in the batch of the source domain labeled data S.

After the sampling and task definition are completed for the meta-batch size $N_{MB}$, a training dataset $D_i^{aug,(tr)}$ is generated for each task $T_i$ at line 508. The training dataset is generated by augmenting the samples in each task $T_i$, based on the selected random object scaling (ROS) technique. That is, the process generates the training dataset $D_i^{aug,(tr)}$ by augmenting the data and the corresponding class labels sampled from the source domain labeled data S.

After generating the training dataset, the training dataset is used to update the parameters of the model. More specifically, a local update is performed based on losses from the augmented training set by first defining a local set of neural network parameters θ' at line 510. The gradients for the local set of parameters are evaluated based on a loss function L for each task $T_i$ at line 512. In this context, local refers to being within the inner loop of the pseudo code 500 shown in FIG. 5. The function $f$ (θ') is the 3D bounding box output of the network when a point cloud P is received as input. The parameter θ is a parameter of the network. The adapted parameters may be computed based on the gradients using a stochastic gradient descent (SGD) process at line 514. The preceding process repeats as an inner loop. An outer loop process will now be described.

The outer loop uses a validation dataset, or a second dataset to perform a global update of the parameters for the neural network model. In this context, global refers to being within the outer loop of the pseudo code 500 shown in FIG. 5. More specifically, a validation dataset $D_i^{aug,(val)}$ is generated based on the number of samples for validation $K^{(val)}$ by performing a random object scaling (ROS) technique for each task in the validation set, at line 516. Each task may correspond to objects and class labels from the validation dataset. The random object scaling distribution for the validation set may differ from the random object scaling technique used for the training set to improve generalization. After augmenting the validation dataset, the network parameters are globally updated based on the validation dataset at line 518. More specifically, losses are collected for the validation set and neural network model parameters are updated using the losses collected from the meta-training.

After the model has been globally updated, the model may receive input from a target dataset to generate labels, for example, bounding boxes. Due to the meta-learning during pre-training, the model generalizes well to the target environment to predict accurate bounding boxes.

Figure 6:
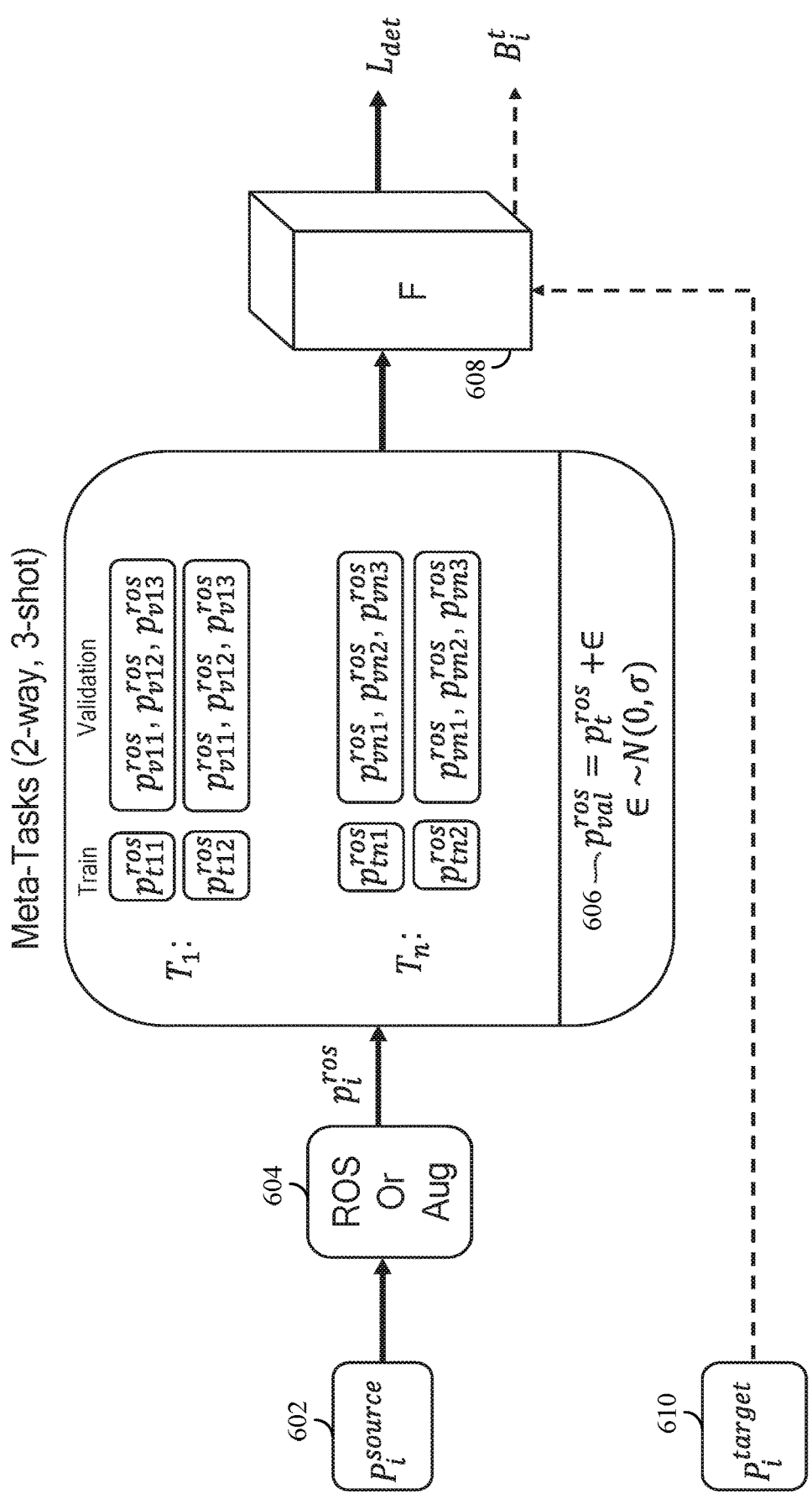
FIG. 6 is a block diagram illustrating processing blocks for meta-pre-training with augmentations to generalize neural network processing for domain adaptation, in accordance with aspects of the present disclosure.

FIG. 6 is a block diagram illustrating processing blocks for meta-pre-training with augmentations to generalize neural network processing for domain adaptation, in accordance with aspects of the present disclosure. The example of FIG. 6 illustrates pre-training for improved generalizability by meta-training. In the example of FIG. 6, point cloud input data $P_i^{source}$ 602 from the source dataset undergoes some type of augmentation (Aug) such as random object scaling (ROS) at block 604 to generate augmented data $P_i^{ros}$.

In the example of FIG. 6, two classes are present. Thus, each task $T_i$ includes augmented data for two classes. Thus, the tasks $T_i$ are referred to as two-way. With the training dataset for the first task $T_1$, the augmented data includes two samples $P_{t11}^{ros}$ and $P_{t12}^{ros}$. For the $n^{th}$ task $T_n$, the augmented data includes two samples $P_{tn1}^{ros}$ and $P_{tn2}^{ros}$. Each validation set includes three samples, referred to as three-shot. For the first task $T_i$, the augmented samples include $P_{v11}^{ros}$, $P_{v12}^{ros}$, and $P_{v13}^{ros}$ representing three different augmentations for validation. Similarly, for the $n^{th}$ task $T_n$, the augmented samples include $P_{vn1}^{ros}$, $P_{vn2}^{ros}$, and $P_{vn3}^{ros}$. In the meta-learning task distribution, different tasks may represent different augmentation strategies or ranges so the network can learn to generalize to different augmentations.

In some aspects, the augmented validation dataset $P_{val}^{ros}$ is calculated from the target dataset $P_t^{ros}$ plus some amount of noise ε, as seen at 606. The noise e may be from a normal distribution with a mean of zero and some variance σ. The variance is generally fixed (it is a hyper-parameter) as a constant throughout the training procedure but can be increased by a multiplying factor at certain intervals. The noise may be added to each value of the target data, for example, X, Y, Z, height, width, length, and angle of the bounding box.

The output from the meta-task processing is the network function F 608 that produces a bounding box based on the point cloud input data $P_i^{source}$ 602. A global loss $L_{det}$ is determined after training the model based on the training data and the validation data.

A network function F 608 is provided to generate bounding boxes. The network function F receives unlabeled target point cloud data $P_i^{target}$ 610 from a target environment. Based on the received target point cloud data $P_i^{target}$ 610, the network function F 608 generates bounding boxes $B_i^{t_i}$ from the target dataset.

Methods pre-trained according to aspects of the present disclosure generalize well to new scenes substantially better than traditional augmentation methods because generalizability during pre-training is evaluated. Because the method uses meta-learning during pre-training, the method can adapt quickly to few-shot fine-tuning. The method also generalizes better from few samples compared to traditional augmentation-based pre-training.

Figure 7:
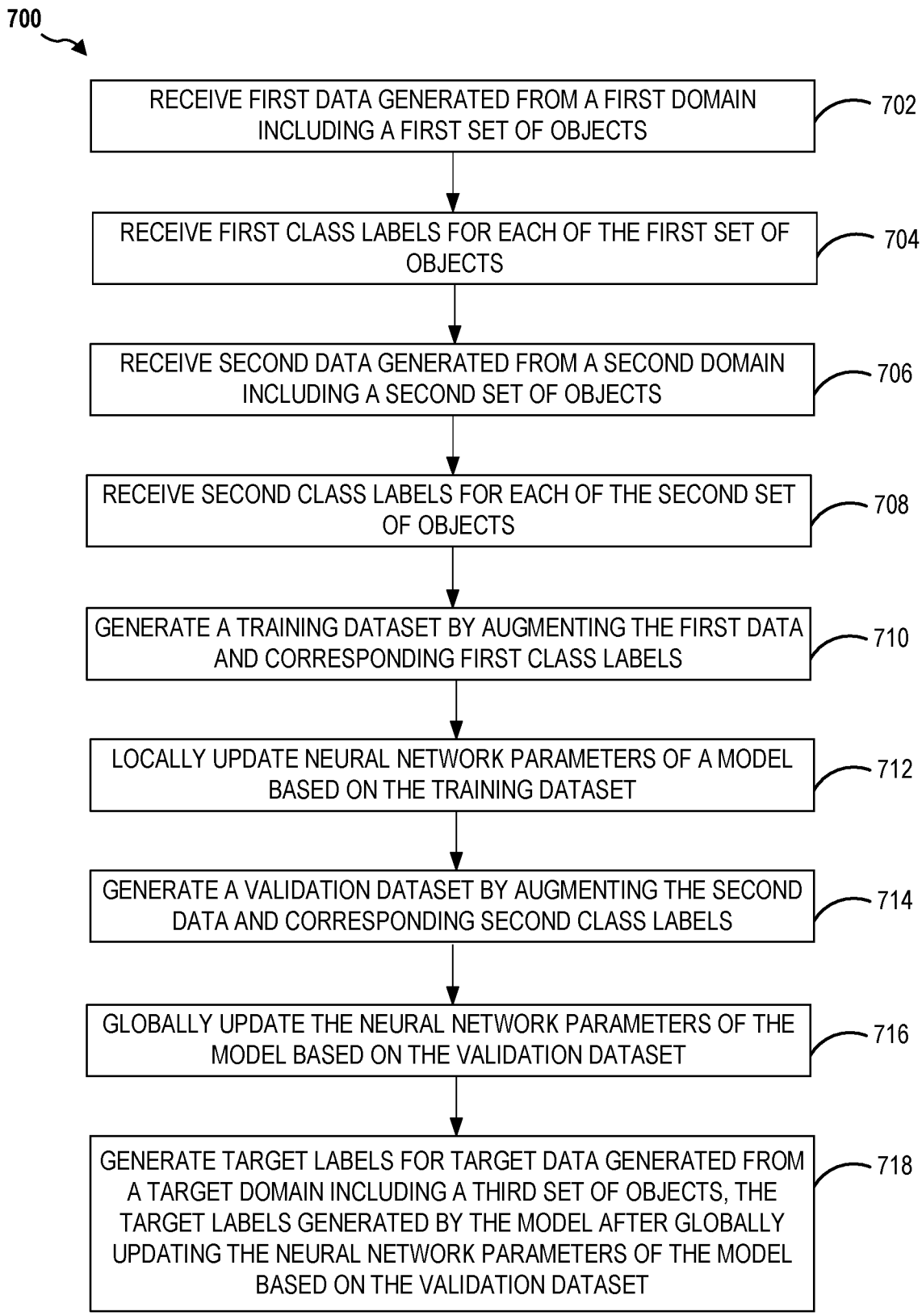
FIG. 7 is a flow diagram illustrating an example process for operating a neural network, in accordance with aspects of the present disclosure.

FIG. 7 is a flow diagram illustrating an example process 700 for meta-pre-training with augmentations to generalize neural network processing for domain adaptation, in accordance with aspects of the present disclosure. As shown in FIG. 7, in some aspects, the process 700 may include receiving first data generated from a first domain including a first set of objects (block 702). In some aspects, the process 700 may include receiving first class labels for each of the first set of objects (block 704). For example, the first domain may be the first source domain including first source domain labeled data. The first source domain labeled data may include input point cloud data and output labels.

In some aspects, the process 700 may include receiving second data generated from a second domain including a second set of objects (block 706). The process 700 may include receiving second class labels for each of the second plurality of objects (block 708). For example, the second domain may be the second source domain including second source domain labeled data. The second source domain labeled data may also include input point cloud data and output labels.

In some aspects, the process 700 may include generating a training dataset by augmenting the first data and corresponding first class labels (block 710). For example, the augmenting may include a random object scaling strategy. The process 700 may include locally updating neural network parameters of a model based on the training dataset (block 712). For example, an updated object detection model may be generated for use with a target domain.

In some aspects, the process 700 may include generating a validation dataset by augmenting the second data and corresponding second class labels (block 714). For example, the validation dataset may be generated by augmenting samples in tasks based on a selected random object scaling technique. The augmenting may include scaling a set of bounding boxes.

In some aspects, the process 700 may include globally updating the neural network parameters of the model based on the validation dataset (block 716). The global update may occur after augmenting the validation dataset. For example, losses may be collected for the validation set and neural network model parameters may be updated using the losses collected from the meta-training.

In some aspects, the process 700 may include generating target labels for target data generated from a target domain including a third set of objects. The target labels are generated by the model after globally updating the neural network parameters of the model based on the validation dataset (block 718). Due to the meta-learning during pre-training, the model generalizes well to the target environment to predict accurate bounding boxes.

Although the present disclosure is described primarily with respect to 3D object detection, the techniques are not so limited. The techniques can be extended to any object recognition task that specifies augmentation during pre-training. That is, the techniques apply to any generic model adapting to another environment, such that the source and destination datasets have different distributions. For example, speaker verification may employ a model for source users, pre-trained for better adaptation to a target user with enrollment data. The model classifies a target speaker and an imposter speaker, even where a large difference exists between source and target speaking styles. The speaker verification model may also have applications with mobile and home personal assistant systems. An image verification model may be applied for biometrics such as face, iris, and hand-writing styles. A generic model learned from source data can use the augmentation techniques of the present disclosure. A fingerprint anti-spoofing model may be useful for distinguishing live and spoof fingerprints where novel spoofs are introduced that have large domain differences from existing fingerprints. Such a model would also benefit from the techniques of the present disclosure. Personalized advanced driver assistance systems (ADAS) pre-train models for classifying a driver engagement level based on a limited number of demonstrations. Augmentation techniques of the present disclosure can assist with domain adaptation in this regard, as well.

EXAMPLE ASPECTS

Aspect 1: A computer-implemented method comprising: receiving first data generated from a first domain including a first plurality of objects; receiving first class labels for each of the first plurality of objects; receiving second data generated from a second domain including a second plurality of objects; receiving second class labels for each of the second plurality of objects; generating a training dataset by augmenting the first data and corresponding first class labels; locally updating neural network parameters of a model based on the training dataset; generating a validation dataset by augmenting the second data and corresponding second class labels; globally updating the neural network parameters of the model based on the validation dataset; and generating a plurality of target labels for target data generated from a target domain including a third plurality of objects, the target labels generated by the model after globally updating the neural network parameters of the model based on the validation dataset.

Aspect 2: The method of Aspect 1, in which the model comprises a three-dimensional (3D) object detection model, the plurality of target labels comprise a plurality of target bounding boxes that localize each of the third plurality of objects defined by the target data.

Aspect 3: The method of Aspect 1 or 2, in which augmenting the first data and the corresponding first class labels comprises scaling a first set of bounding boxes, and augmenting the second data and the corresponding second class labels comprises scaling a second set of bounding boxes.

Aspect 4: The method of any of the preceding Aspects, in which a first distribution for augmenting the first data and the corresponding first class labels differs from a second distribution for augmenting the second data and the corresponding second class labels.

Aspect 5: The method of any of the preceding Aspects, in which the locally updating occurs based on each class type of the first class labels within an inner loop and the globally updating occurs based on each class type of the second class labels within an outer loop.

Aspect 6: The method of any of the preceding Aspects, in which the first domain comprises a first environment, the first data comprises first point cloud data, the second domain comprises a second environment, the second data comprises second point cloud data, the target domain comprises a target environment, and the target data comprises target point cloud data.

Aspect 7: An apparatus, comprising: a memory; and at least one processor coupled to the memory, the at least one processor configured: to receive first data generated from a first domain including a first plurality of objects; to receive first class labels for each of the first plurality of objects; to receive second data generated from a second domain including a second plurality of objects; to receive second class labels for each of the second plurality of objects; to generate a training dataset by augmenting the first data and corresponding first class labels; to locally update neural network parameters of a model based on the training dataset; to generate a validation dataset by augmenting the second data and corresponding second class labels; to globally update the neural network parameters of the model based on the validation dataset; and to generate a plurality of target labels for target data generated from a target domain including a third plurality of objects, the target labels generated by the model after globally updating the neural network parameters of the model based on the validation dataset.

Aspect 8: The apparatus of Aspect 7, in which the model comprises a three-dimensional (3D) object detection model, the plurality of target labels comprise a plurality of target bounding boxes that localize each of the third plurality of objects defined by the target data.

Aspect 9: The apparatus of Aspect 7 or 8, in which the at least one processor is further configured to augment the first data and the corresponding first class labels by scaling a first set of bounding boxes, and configured to augment the second data and the corresponding second class labels by scaling a second set of bounding boxes.

Aspect 10: The apparatus of any of the Aspects 7-9, in which a first distribution for augmenting the first data and the corresponding first class labels differs from a second distribution for augmenting the second data and the corresponding second class labels.

Aspect 11: The apparatus of any of the Aspects 7-10, in which the at least one processor is further configured to locally update the neural network parameters based on each class type of the first class labels within an inner loop and configured to globally update based on each class type of the second class labels within an outer loop.

Aspect 12: The apparatus of any of the Aspects 7-11, in which the first domain comprises a first environment, the first data comprises first point cloud data, the second domain comprises a second environment, the second data comprises second point cloud data, the target domain comprises a target environment, and the target data comprises target point cloud data.

Aspect 13: A non-transitory computer-readable medium having program code recorded thereon, the program code executed by a processor and comprising: program code to receive first data generated from a first domain including a first plurality of objects; program code to receive first class labels for each of the first plurality of objects; program code to receive second data generated from a second domain including a second plurality of objects; program code to receive second class labels for each of the second plurality of objects; program code to generate a training dataset by augmenting the first data and corresponding first class labels; program code to locally update neural network parameters of a model based on the training dataset; program code to generate a validation dataset by augmenting the second data and corresponding second class labels; program code to globally update the neural network parameters of the model based on the validation dataset; and program code to generate a plurality of target labels for target data generated from a target domain including a third plurality of objects, the target labels generated by the model after globally updating the neural network parameters of the model based on the validation dataset.

Aspect 14: The non-transitory computer-readable medium of Aspect 13, in which the model comprises a three-dimensional (3D) object detection model, the plurality of target labels comprise a plurality of target bounding boxes that localize each of the third plurality of objects defined by the target data.

Aspect 15: The non-transitory computer-readable medium of Aspect 13 or 14, in which the program code to generate a training dataset by augmenting the first data and corresponding first class labels further comprises program code to scale a first set of bounding boxes, and program code to generate a validation dataset by augmenting the second data and corresponding second class labels further comprises program code to scale a second set of bounding boxes.

Aspect 16: The non-transitory computer-readable medium of any of the Aspects 13-15, in which a first distribution for augmenting the first data and the corresponding first class labels differs from a second distribution for augmenting the second data and the corresponding second class labels.

Aspect 17: The non-transitory computer-readable medium of any of the Aspects 13-16, in which the program code to locally update is based on each class type of the first class labels within an inner loop and the program code to globally update updates based on each class type of the second class labels within an outer loop.

Aspect 18: The non-transitory computer-readable medium of any of the Aspects 13-17, in which the first domain comprises a first environment, the first data comprises first point cloud data, the second domain comprises a second environment, the second data comprises second point cloud data, the target domain comprises a target environment, and the target data comprises target point cloud data.

Aspect 19: An apparatus for a computer-implemented method, comprising: means for receiving first data generated from a first domain including a first plurality of objects; means for receiving first class labels for each of the first plurality of objects; means for receiving second data generated from a second domain including a second plurality of objects; means for receiving second class labels for each of the second plurality of objects; means for generating a training dataset by augmenting the first data and corresponding first class labels; means for locally updating neural network parameters of a model based on the training dataset; means for generating a validation dataset by augmenting the second data and corresponding second class labels; means for globally updating the neural network parameters of the model based on the validation dataset; and means for generating a plurality of target labels for target data generated from a target domain including a third plurality of objects, the target labels generated by the model after globally updating the neural network parameters of the model based on the validation dataset.

Aspect 20: The apparatus of Aspect 19, in which the model comprises a three-dimensional (3D) object detection model, the plurality of target labels comprise a plurality of target bounding boxes that localize each of the third plurality of objects defined by the target data.

Aspect 21: The apparatus of Aspect 19 or 20, in which the means for generating a training dataset by augmenting the first data and the corresponding first class labels comprises means for scaling a first set of bounding boxes, and the means for generating a validation dataset by augmenting the second data and corresponding second class labels comprises means for scaling a second set of bounding boxes.

Aspect 22: The apparatus of any of the Aspects 19-21, in which a first distribution for augmenting the first data and the corresponding first class labels differs from a second distribution for augmenting the second data and the corresponding second class labels.

Aspect 23: The apparatus of any of the Aspects 19-22, in which the means for locally updating is based on each class type of the first class labels within an inner loop and the means for globally updating is based on each class type of the second class labels within an outer loop.

Aspect 24: The apparatus of any of the Aspects 19-23, in which the first domain comprises a first environment, the first data comprises first point cloud data, the second domain comprises a second environment, the second data comprises second point cloud data, the target domain comprises a target environment, and the target data comprises target point cloud data.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A computer-implemented method comprising:
receiving first data generated from a first domain including a first plurality of objects;
receiving first class labels for each of the first plurality of objects;
receiving second data generated from a second domain including a second plurality of objects;
receiving second class labels for each of the second plurality of objects;
generating a training dataset for each task of a set of tasks by augmenting samples of each task, the first data and corresponding first class labels comprising a first set of bounding boxes, each task representing a different augmentation strategy;
locally updating neural network parameters of a model based on the training dataset;
generating a validation dataset by augmenting the second data and corresponding second class labels comprising a second set of bounding boxes;
globally updating the neural network parameters of the model based on the validation dataset; and
generating a plurality of target labels for target data generated from a target domain including a third plurality of objects, the target labels generated by the model after globally updating the neural network parameters of the model based on the validation dataset.

2. The method of claim 1, in which the model comprises a three-dimensional (3D) object detection model, the plurality of target labels comprise a plurality of target bounding boxes that localize each of the third plurality of objects defined by the target data.

3. The method of claim 2, in which augmenting the first data and the corresponding first class labels comprises scaling the first set of bounding boxes, and augmenting the second data and the corresponding second class labels comprises scaling the second set of bounding boxes.

4. The method of claim 1, in which a first distribution for augmenting the first data and the corresponding first class labels differs from a second distribution for augmenting the second data and the corresponding second class labels.

5. The method of claim 1, in which the locally updating occurs based on each class type of the first class labels within an inner loop and the globally updating occurs based on each class type of the second class labels within an outer loop.

6. The method of claim 1, in which the first domain comprises a first environment, the first data comprises first point cloud data, the second domain comprises a second environment, the second data comprises second point cloud data, the target domain comprises a target environment, and the target data comprises target point cloud data.

7. An apparatus, comprising:
at least one memory; and
at least one processor coupled to the at least one memory, the at least one processor configured:
to receive first data generated from a first domain including a first plurality of objects;
to receive first class labels for each of the first plurality of objects;
to receive second data generated from a second domain including a second plurality of objects;

to receive second class labels for each of the second plurality of objects;

to generate a training dataset for each task of a set of tasks by augmenting samples of each task, the first data and corresponding first class labels comprising a first set of bounding boxes, each task representing a different augmentation strategy;

to locally update neural network parameters of a model based on the training dataset;

to generate a validation dataset by augmenting the second data and corresponding second class labels comprising a second set of bounding boxes;

to globally update the neural network parameters of the model based on the validation dataset; and to generate a plurality of target labels for target data generated from a target domain including a third plurality of objects, the target labels generated by the model after globally updating the neural network parameters of the model based on the validation dataset.

8. The apparatus of claim 7, in which the model comprises a three-dimensional (3D) object detection model, the plurality of target labels comprise a plurality of target bounding boxes that localize each of the third plurality of objects defined by the target data.

9. The apparatus of claim 8, in which the at least one processor is further configured to augment the first data and the corresponding first class labels by scaling the first set of bounding boxes, and further configured to augment the second data and the corresponding second class labels by scaling the second set of bounding boxes.

10. The apparatus of claim 7, in which a first distribution for augmenting the first data and the corresponding first class labels differs from a second distribution for augmenting the second data and the corresponding second class labels.

11. The apparatus of claim 7, in which the at least one processor is further configured to locally update the neural network parameters based on each class type of the first class labels within an inner loop and configured to globally update based on each class type of the second class labels within an outer loop.

12. The apparatus of claim 7, in which the first domain comprises a first environment, the first data comprises first point cloud data, the second domain comprises a second environment, the second data comprises second point cloud data, the target domain comprises a target environment, and the target data comprises target point cloud data.

13. A non-transitory computer-readable medium having program code recorded thereon, the program code executed by a processor and comprising:

program code to receive first data generated from a first domain including a first plurality of objects;

program code to receive first class labels for each of the first plurality of objects;

program code to receive second data generated from a second domain including a second plurality of objects;

program code to receive second class labels for each of the second plurality of objects;

program code to generate a training dataset for each task of a set of tasks by augmenting samples of each task, the first data and corresponding first class labels comprising a first set of bounding boxes, each task representing a different augmentation strategy;

program code to locally update neural network parameters of a model based on the training dataset;

program code to generate a validation dataset by augmenting the second data and corresponding second class labels comprising a second set of bounding boxes;

program code to globally update the neural network parameters of the model based on the validation dataset; and program code to generate a plurality of target labels for target data generated from a target domain including a third plurality of objects, the target labels generated by the model after globally updating the neural network parameters of the model based on the validation dataset.

14. The non-transitory computer-readable medium of claim 13, in which the model comprises a three-dimensional (3D) object detection model, the plurality of target labels comprise a plurality of target bounding boxes that localize each of the third plurality of objects defined by the target data.

15. The non-transitory computer-readable medium of claim 14, in which the program code to generate the training dataset by augmenting the first data and the corresponding first class labels further comprises program code to scale the first set of bounding boxes, and the program code to generate the validation dataset by augmenting the second data and corresponding second class labels further comprises program code to scale the second set of bounding boxes.

16. The non-transitory computer-readable medium of claim 13, in which a first distribution for augmenting the first data and the corresponding first class labels differs from a second distribution for augmenting the second data and the corresponding second class labels.

17. The non-transitory computer-readable medium of claim 13, in which the program code to locally update is based on each class type of the first class labels within an inner loop and the program code to globally update updates based on each class type of the second class labels within an outer loop.

18. The non-transitory computer-readable medium of claim 13, in which the first domain comprises a first environment, the first data comprises first point cloud data, the second domain comprises a second environment, the second data comprises second point cloud data, the target domain comprises a target environment, and the target data comprises target point cloud data.

19. An apparatus for a computer-implemented method, comprising:

means for receiving first data generated from a first domain including a first plurality of objects;

means for receiving first class labels for each of the first plurality of objects;

means for receiving second data generated from a second domain including a second plurality of objects;

means for receiving second class labels for each of the second plurality of objects;

means for generating a training dataset for each task of a set of tasks by augmenting samples of each task, the first data and corresponding first class labels comprising a first set of bounding boxes, each task representing a different augmentation strategy;

means for locally updating neural network parameters of a model based on the training dataset;

means for generating a validation dataset by augmenting the second data and corresponding second class labels comprising a second set of bounding boxes;

means for globally updating the neural network parameters of the model based on the validation dataset; and means for generating a plurality of target labels for target data generated from a target domain including a third plurality of objects, the target labels generated by the model after globally updating the neural network parameters of the model based on the validation dataset.

20. The apparatus of claim 19, in which the model comprises a three-dimensional (3D) object detection model, the plurality of target labels comprise a plurality of target bounding boxes that localize each of the third plurality of objects defined by the target data.

21. The apparatus of claim 20, in which the means for generating the training dataset by augmenting the first data and the corresponding first class labels comprises means for scaling the first set of bounding boxes, and the means for generating the validation dataset by augmenting the second data and corresponding second class labels comprises means for scaling the second set of bounding boxes.

22. The apparatus of claim 19, in which a first distribution for augmenting the first data and the corresponding first class labels differs from a second distribution for augmenting the second data and the corresponding second class labels.

23. The apparatus of claim 19, in which the means for locally updating is based on each class type of the first class labels within an inner loop and the means for globally updating is based on each class type of the second class labels within an outer loop.

24. The apparatus of claim 19, in which the first domain comprises a first environment, the first data comprises first point cloud data, the second domain comprises a second environment, the second data comprises second point cloud data, the target domain comprises a target environment, and the target data comprises target point cloud data.

* * * * *